(12) United States Patent
Yu et al.

(10) Patent No.: US 11,106,421 B2
(45) Date of Patent: Aug. 31, 2021

(54) DISPLAY METHOD AND SYSTEM FOR WIRELESS INTELLIGENT MULTI-SCREEN DISPLAY

(71) Applicant: Shenzhen Divoom Technology Co., LTD., Guangdong (CN)

(72) Inventors: Chaoliang Yu, Guangdong (CN); Jun Ai, Guangdong (CN)

( * ) Notice: Subject to any disclaimer, the term of this patent is extended or adjusted under 35 U.S.C. 154(b) by 0 days.

(21) Appl. No.: 16/650,287

(22) PCT Filed: Oct. 27, 2017

(86) PCT No.: PCT/CN2017/107913
§ 371 (c)(1),
(2) Date: Mar. 24, 2020

(87) PCT Pub. No.: WO2019/075768
PCT Pub. Date: Apr. 25, 2019

(65) Prior Publication Data
US 2020/0257487 A1 Aug. 13, 2020

(30) Foreign Application Priority Data
Oct. 18, 2017 (CN) .......................... 201710969375.2

(51) Int. Cl.
*G06F 3/14* (2006.01)
*H04W 8/22* (2009.01)
*H04M 1/72412* (2021.01)

(52) U.S. Cl.
CPC .......... *G06F 3/1454* (2013.01); *G06F 3/1423* (2013.01); *H04M 1/72412* (2021.01); *H04W 8/22* (2013.01)

(58) Field of Classification Search
CPC combination set(s) only.
See application file for complete search history.

(56) References Cited

U.S. PATENT DOCUMENTS 6,348,933 B1 * 2/2002 Walls ...................... G06F 3/023
707/999.202
10,116,778 B2 * 10/2018 Li ........................ H04M 1/0249
(Continued)

FOREIGN PATENT DOCUMENTS

CN 103366715 A 10/2013
CN 103377021 A * 10/2013 ............... G06F 3/14
(Continued)

*Primary Examiner* — Jeff Piziali
(74) *Attorney, Agent, or Firm* — Eugenio J. Torres-Oyola; Victor M. Rodriguez-Reyes; Rafael Rodriguez-Muriel

(57) ABSTRACT

Disclosed is a display method for a wireless intelligent multi-screen display. A control terminal and at least two displays are comprised, wherein the control terminal comprises a first wireless communication module; the displays comprise a second wireless communication module; and the control terminal is connected to each of the displays by means of wireless communication. The display method comprises the following steps: a control terminal scanning nearby displays to establish a connection with the displays, wherein a display mode is configured at the control terminal or the displays according to the number of displays and/or a combination mode thereof, and a corresponding device ID is configured for each of the displays; the control terminal encoding, according to the configured display mode, image data, which is to be transmitted, into sub-image data corresponding to each of the displays.

13 Claims, 5 Drawing Sheets

(56) References Cited

U.S. PATENT DOCUMENTS

| | | | | |
|---|---|---|---|---|
| 10,360,871 | B2 * | 7/2019 | Chen | ................ G06F 3/1446 |
| 10,445,049 | B2 * | 10/2019 | Li | ................ H04M 1/0256 |
| 2006/0116164 | A1 | 6/2006 | Kang | |

FOREIGN PATENT DOCUMENTS

| | | | | | |
|---|---|---|---|---|---|
| CN | 104375798 | A | | 2/2015 | |
| CN | 106502603 | A | * | 3/2017 | ............ G06F 3/14 |
| CN | 1065022603 | A | | 3/2017 | |

* cited by examiner

E          F

DISPLAY METHOD AND SYSTEM FOR WIRELESS INTELLIGENT MULTI-SCREEN DISPLAY

TECHNICAL FIELD

The present disclosure relates to the technical field of electronics, and in particular, to a display method of wireless intelligent multi-screen display and a system thereof.

BACKGROUND

With the development of informatization, people are more and more reliant on different kinds of electronic terminal. Electronic terminals generally have only one screen, and due to the limited the size of the screen, they are often incapable of displaying complex images. Further, users usually have more than one electronic terminal with a screen, however, different screens from different terminals are independent from each other and thus cannot be joined for collaborative use, which undoubtedly leads to a waste of resources. Therefore, how different screens from different electronic terminals can be joined for collaborative use has become an issue that many factories and companies intend to solve.

SUMMARY

In order to address the above issue, according to a first aspect of the present disclosure, a display method of a wireless intelligent multi-screen display is provided. Said method is based on a control terminal and at least two displays, the control terminal includes a first wireless communication module, and the display includes a second wireless communication module, the control terminal is connected to each of the displays by means of wireless communication, the display method includes the following steps: the control terminal scans a display at a designated location and establishes a connection with the display; configures a display mode at the control terminal or the display based on the quantity and/or combination manner of the display, with a device ID assigned to the corresponding display; the control terminal encodes image data which is to be transmitted into sub-image data which corresponds to each display according to the configured display mode; the control terminal transmits the corresponding sub-image data to each display according to the corresponding device ID; each display caches the sub-image data that the it receives, and meanwhile plays the sub-image data after receiving a play command from the control terminal.

Preferably, the step of the control terminal scanning a display at a nearby location and connecting to the display further includes the following sub-steps: the control terminal scans nearby displays and establishes a connection with one of the displays; the display which has been connected with the control terminal scans other nearby displays and establishes a connection with one of the displays which are to be connected; the connected display scans other nearby displays and establishes a connection with one of the displays which are to be connected; repeats the above sub-steps until single-link serial connections are established between a mobile phone and each of the displays.

Preferably, the first wireless communication module and the second wireless communication module are both Bluetooth communication modules.

Preferably, the display is LED matrix.

Preferably, different device ID is assigned to each display based on the MAC address of the second wireless communication module of the display.

Preferably, the display mode includes a layout table recording the corresponding relations between the device IDs and the sub-image data; and the control terminal transmits the corresponding sub-image data to each display based on the layout table.

Preferably, the control terminal or the display further includes an input unit, and the display method further includes steps of: updating the layout table of the display mode based on a input of the input unit; transmitting the corresponding sub-image data to each display based on the updated layout table.

According to a second aspect of the present disclosure, a display system of wireless intelligent multi-screen display is provided, including the following modules: a first module, in which a control terminal scans nearby displays to establish connections with such displays; a second module, in which the control terminal or display is configured with a display mode based on the quantity and combination manner of the displays and a device ID is assigned to each corresponding display; a third module, in which the control terminal encodes the image data which is to be transmitted into sub-image data which corresponds to each display based on the configured display mode; a fourth module, in which the control terminal transmits the corresponding sub-image data to each display according to the corresponding device ID; a fifth module, in which each of the displays which receives the corresponding sub-image data caches the sub-image data, and meanwhile plays the sub-image data after receiving a play command.

According to a third aspect of the present disclosure, a computer-readable storage medium on which computer instructions are stored is provided, and the steps of the method according to the first aspect of the present disclosure can be implemented when the instructions are executed by a processor.

According to a fourth aspect of the present disclosure, a display method of wireless intelligent multi-screen display is provided, it is based on a control terminal and at least two displays, the control terminal includes a first wireless communication module and the displays include a second wireless communication module, the control terminal is connected to each of the displays by means of wireless communication, the control terminal scans a display at a designated location and establishes a connection with the display; a display mode is configured at the display based on the quantity and/or combination manner of each display, with a device ID assigned to the corresponding display; the control terminal transmits image data which are to be transmitted to a display, the display encodes the image data which is to be transmitted into the sub-image data which corresponds to each display based on the configured display mode; the display transmits the corresponding sub-image data to other displays according to the corresponding device ID; and each display which has received the corresponding sub-image data caches the sub-image data that the display receives, and meanwhile plays the sub-image data after receiving a play command from the control terminal.

Preferably, the step of the control terminal scanning a display at a nearby location and connecting to the display further includes the following sub-steps: the control terminal scans nearby displays and establishes a connection with one of the displays; the display which has been connected with the control terminal scans other nearby displays and establishes a connection with one of the displays which are to be connected; the connected display scans other nearby displays and establishes a connection with one of the displays which are to be connected; repeats the above sub-steps until single-link serial connections are established between a mobile phone and each of the displays.

Preferably, the first wireless communication module and the second wireless communication module are both Bluetooth communication modules.

Preferably, the display is LED matrix.

Preferably, different device ID is assigned to each display based on the MAC address of the second wireless communication module of the display.

Preferably, the display mode includes a layout table recording the corresponding relations between the device IDs and the sub-image data; and the control terminal transmits the corresponding sub-image data to each display based on the layout table.

Preferably, the control terminal or the display further includes an input unit, and the display method further includes steps of: updating the layout table of the display mode based on the input of the input unit; transmitting the corresponding sub-image data to each display based on the updated layout table.

The advantages of the disclosure are as follows: multiple display devices can be connected in serial to form a large display device for collaborative use, and the single-link connection between the mobile and display can simplify the design of the mobile app, and there is no need to consider the components of a display devices group, that is, a group of multiple display devices can be used as a complete display device, demonstrating a wider use in different occasions.

DETAILED DESCRIPTION

The technical solutions in the embodiments of the present invention will be described clearly, completely with reference to the drawings in the embodiments of the present disclosure. Obviously, the described embodiments are merely a part of the embodiments of the present disclosure, but not all the embodiments. Based on the embodiments of the present disclosure, all other embodiments, obtained without creative efforts by a skilled person in the art, shall fall within the protection scope of the present disclosure.

Referring to FIG. 1 to FIG. 5, a display method of wireless intelligent multi-screen display that is used for a system comprising a control terminal and multiple displays, is provided by an embodiment of the present disclosure. The hardware used by the present embodiment basically comprises two parts, the first part is a control terminal in which an APP is stored, this part enables connections and choices of displays, leading to an arrangement of the displays, pictures or videos are created by users using an APP, then the pictures or videos which have been encoded are transmitted to the displays; the other part consists of multiple displays having Bluetooth communication function, the image data from the APP are received and decoded after connections are established between the displays and the APP, leading to display of the pictures on the displays. Here, it should be understood that the 'display(s)' refers to any device which has a liquid crystal screen, LED matrix or other type of display module such as a Bluetooth intelligent speaker with LED matrix lights and etc. A control terminal with an APP stored therein may be a mobile phone, portable intelligent terminal, PC and etc.

Figure 1:
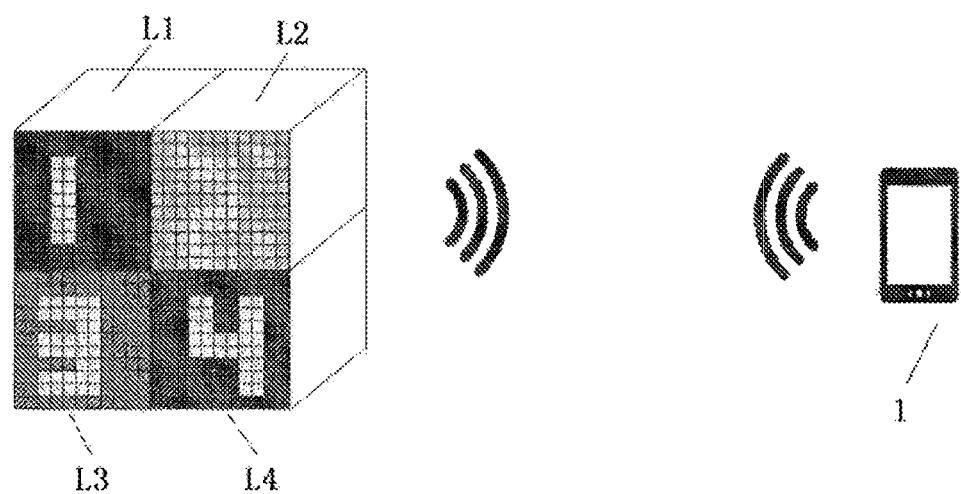
FIG. 1 shows the schematic drawing of a control terminal and multiple displays according to an embodiment of the present disclosure.

The connection relation between the control terminal and multiple displays are shown as FIG. 1. Schematically, the control terminal 1 comprises the first wireless communication module; each of the displays L1-L4 comprises a display screen and a second wireless communication module (not shown in the figures). The control terminal 1 is connected to each of the displays L1-L4 by the first wireless communication module and the second communication module in a manner of wireless communication. Here, the control terminal 1 may be a smart phone which is able to run a pre-installed App to perform the display method of the present disclosure and etc., and displays L1-L4 are 4 same Bluetooth speakers, all with LED matrix, and the first wireless communication module and the second wireless communication module are Bluetooth modules complying with the standard of Bluetooth Low Energy, they not only reduce the standby power, extend battery life but also makes multi-device communication become possible.

In this embodiment, displays L1-L4 are arranged in a combination manner of 2×2 (i.e. a layout of two rows and two columns), every frontal face having a screen (LED matrix) points to the same direction, thereby forming a large screen of a rectangular shape. However, it is to be understood that the displays may also be arranged in a layout of 2×3, 2×4, 2×5, 2×6, 2×7, 2×8, 3×3, 3×4, 3×5, 4×4 and etc., size and resolution of the screens of displays are not required to be exactly the same, and so are the directions that the frontal faces of the screen points to.

The display method comprises the following steps: the control terminal scans the display at a nearby location and connects to the display, a display mode is configured at the control terminal or at the display based on the quantity and combinative manner of the displays, with a device ID assigned to the corresponding display; the control terminal divides the image data which is to be transmitted into sub-image data based on the display mode; the control terminal transmits the corresponding sub-image data to each display according to the corresponding device ID; each display caches the sub-image data that it receives, and meanwhile plays the sub-image data after it receives a play command.

Detailed description of the workflow and steps in regard of the above two parts is presented as follows. (Please note that the displays L1-L4 are referred to display devices L1-L4 and the control terminal 1 is referred to mobile).

Part One. Process on the Mobile

The functions of a mobile phone can be divided into the following sections: 1: Connect a device; 2: Draw a single picture; 3: Send a set of moving images; 4: Send a real-time video; description of the above sections is described as follows.

I. Connection Management of Multiple Display Devices

Regarding the display mode for multiple display devices, description of the display mode for 16 (as the maximum number) display devices are presented here due to a consideration of complexity of description, however, the method disclosed by the present disclosure is not intended to limit the display capacity to be 16 as maximum. The system would provide a template which is fit for multiple devices so that users can choose a proper one. Templates with a layout of 2×3, 2×4, 2×5, 2×6, 2×7, 2×8, 3×4, 3×5, 4×4 are provided, which are fit for the layouts of users' devices. For example, 2×2 means a user intends to arrange 4 devices, with a layout of two rows and two columns and 3×4 means a layout of three rows and four columns.

First, a proper device template can be selected through an APP in a mobile phone based on the quantity and layout of current display devices. For example, four display devices can be fit for a device template with a layout of 1×4, 2×2, 4×1 and etc.

Second, dot size of the selected template is presented on the panel. For example, when the display device is presented with a dot size of X×Y and the user select the template with a layout of N×M, then the panel of the APP would present with dots of (X×N)×(Y×M).

Third, press the Add button in the mobile app, at this time, the app would search the display device whose Bluetooth device name includes certain keywords such as divoom-timebox, if so, the display device L1 as the first display device would be connected by means of BLE or SPP, and the number 1 of the display device L1 means this is the first location. The device IDs are arranged in a template of N×M, and increase in the direction of left to right and top to bottom such that the device ID of the first display device is 1 and the device ID of the last display device is N×M.

Fourth, the display device L1 searches for a display device whose Bluetooth device name includes certain keywords such as divoom-timebox, if such display device has been found, the display device L1 would be connected to the new display device L2, and a unique device ID 2 is assigned to the display device L2 by the display device L1, with the device ID being sent by BLE or SPP to the display device L2, the screen of which presents '2';

Fifth, the display device L2 searches for a display device whose Bluetooth device name includes certain keywords such as divoom-timebox, if such display device has been found, the display device L2 would be connected to the new display device L3, and a unique device ID 3 is assigned to the display device L3 by the display device L2, with the device ID 3 being sent by BLE or SPP to the display device L3, the screen of which presents '3';

Sixth, repeat the fifth step until a stop command for searches is received from the mobile app.

Figure 5:
FIG. 5 shows the schematic drawing of the connection between a mobile and the display devices according to an embodiment of the present disclosure.

The connection between a mobile and a display device can be referred to FIG. 5, in which a single-link serial connection is established between the mobile and displays, demonstrating the following advantages: a Bluetooth can be connected to 7 Bluetooth devices according to the current Bluetooth standard, and more display devices can be added into the connection after the serial connection is formed.

Here, the display mode can be preset in the mobile, or can be configured at the mobile or the device based on the quantity and combination manner of the displays after scanning and pairing the nearby Bluetooth devices, with a device ID assigned to the corresponding display device.

Besides, a device whose Bluetooth device name includes certain keywords may be searched by a mobile to acquire the MAC address of the Bluetooth module (i.e. the first wireless communication module) of each of devices L1-L4, and then a unique device ID is assigned to each display device. The rest of the steps are the same as the above method and therefore are not described here.

Figure 2:
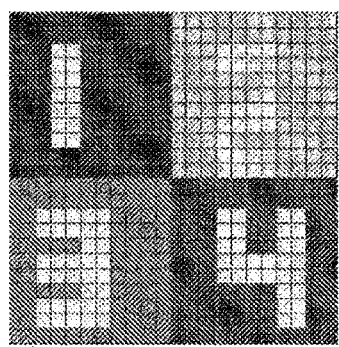
FIG. 2 shows the schematic drawing of a combined multi-display of 4 displays and a combined multi-display of 3 displays, in which according to an embodiment of the present disclosure, element A shows the combined multi-display of 4 displays and B shows the combined multi-display of 3 displays.
Figure 2:
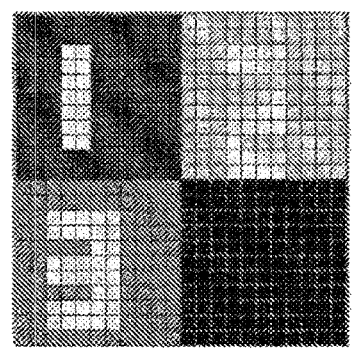
Figure 3:
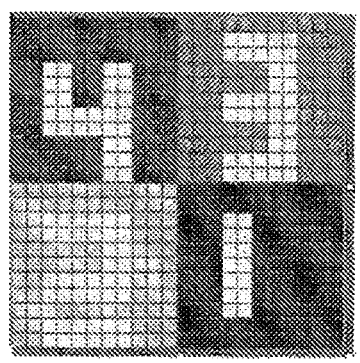
FIG. 3 shows the schematic drawing of a multi-display combined by 4 displays in element A of FIG. 2 with their device IDs changed.
Figure 3:
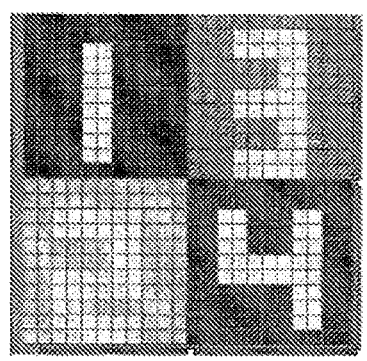
Figure 4:
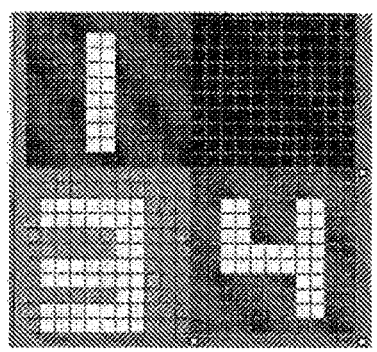
FIG. 4 shows the schematic drawing of a multi-display combined by 3 displays in element B of FIG. 2 with their device IDs changed.
Figure 4:
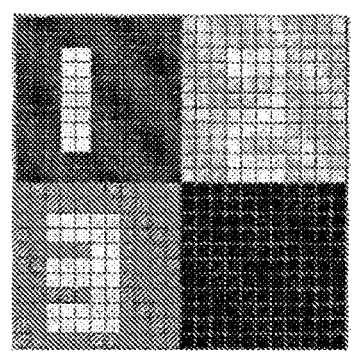

Take (the layout of) 2×2 as an example, if 4 display devices are successfully connected, the panel of the mobile app would be presented as A in FIG. 2, the display device would display a device ID which corresponds to the panel of the app, and if there are fewer than 4 display devices (for example, only 3), then the panel of the mobile app would be presented as B in FIG. 2. The mobile can acquire the parameters of each display device such as its size, resolution and etc. by means of wireless Bluetooth communication, and based on the quantity of paired display devices, size and resolution of the displays, the mobile provides available display modes such as 4×1, 1×4, 2×2 and etc. to users.

The display mode comprises a layout table recording the corresponding relation between the device IDs and sub-image data, and the mobile transmits the corresponding sub-image data to each display according to the layout table. The mobile or display device further comprises an input unit, such as a touch screen of a mobile, etc. The display method of this embodiment further comprises steps of: updating the layout table of display mode according to the input of the input unit; and according to the updated layout table, transmitting corresponding sub-image data to each display device by mobile or one of the display devices.

After the display device displays the corresponding device ID, if the order that the display devices are arranged is not the same as what the mobile app presents, then users are required to adjust the device ID manually by the app or reorder the devices manually according to the device IDs. Now, the reordering by means of the app is described here: take A in FIG. 2 for example, user long presses 4 then clicks 1, switching the positions of the images shown as 4 and 1, this results in C shown in FIG. 3. In this case, the order that the devices are arranged is the same as the app presents, and if the device data does not reach N×M, user can leave any position as blank (which means the image data of the display device corresponding to the layout table is switched to all blank or all black), shown as E and F in FIG. 4.

Eventually, the numeral IDs displayed by the display devices start from left to right, successively ranging from 1 to N, then from top to bottom, such that an arrangement of devices in a layout of N×M is done.

II. Draw a Single Picture

First, N×M display devices are connected and arranged properly by user; Second, when user starts to use the artboard in app to draw a picture, if user has N×M display devices which are shown as A in FIG. 2, user can use the artboard without any restrictions; if user's display devices are fewer than N×M as shown in B of FIG. 2, user's brush cannot be operated in the section not showing any display device (the lower right section), the brush can only be operated in the section showing a display device so that a picture can be created;

Third, when user uses the brush to draw on the artboard, mobile app would transmit real-time changing image to the corresponding display device when the brush is moving, the corresponding display device displays color of the corresponding dot according to an changing image command (the data to be transmitted includes two kinds of information, the device IDs and image data);

Fourth, when the display device receives image data, the device compares its device ID to the device ID included in the command, if they are different, the data would be forwarded to the next device directly; and if the device is the last one, the data would be discarded; and if two device IDs are the same, the device would display the corresponding data;

Fifth, repeat the fourth step until data transmission is completed.

III. Display a Set of Animations

First, N×M display devices are connected and arranged properly;

Second, user draws and saves multiple pictures, and when user clicks the Send button, animation data of a single device would be compression-coded respectively in consideration of out-of-sync animation caused by transmission communication delay of multiple display devices, then the coded animation data corresponding to the 'device ID+device' would be transmitted to each display device, but it is to be understood that the process of compression coding may be implemented on mobile or on any display device (i.e. for mobile terminal, there is no need to consider the components of a display devices group, such mobile terminal may be used as a complete display device)

Third, when each display device receives the image data, the device compares its device ID to the device ID of command data to identify if they are the same, if so, image data would be buffered, if not, image data would be forwarded to the next device if the current device is not the last one on the link, or the data would be discarded if the current device is the last one on the link.

Fourth, send a play command after all the data have been transmitted.

Fifth, the device receives the play command, plays the data which is buffering and forwards the play command to the next device, such that multi-screen synchronous playing is achieved.

IV. Display a Real-Time Video

First, N×M display devices are connected and arranged properly; Second, relevant display settings are configured through a LED video editor from mobile app by a user Third, image data of dots of (N×X)×(Y×M) are generated through the mobile app by the user Fourth, the app encodes the image data of the section that each device is in respectively so as to generate the sub-image data corresponding to each display device, and transmits the device IDs and the sub-image data to device A;

Fifth, when the display device receives a video command, the device compares its device ID to the device ID of the command data, if they are the same, real-time display would be performed; if not, and if the device is not the last one in the link, the video command would be forwarded to next device, or if the device is the last one in the link, the data would be discarded directly.

Part Two. Workflow of a Display Device

First, the display device is in waiting state;

Second, the display device receives connection from a mobile app and accepts it, then the device waits for a command from mobile app Third, if a Start Search command is received from the mobile app, switch to step 7, if not, switch to step 4.

Fourth, if a Stop Search command is received from the mobile app, switch to step 9, if not, switch to step 5.

Fifth, if a Stop command is received from the mobile app, switch to step 2, if not, switch to step 10.

Sixth, if an Image Data command is received from the mobile app, compares the device ID of the display device and the device ID of the display device that is in the image data, if they are the same, the data would be displayed directly; if not, and if the display device is the last one in the link, the data would be discarded, if the display device is the last one in the link, then the device would forward the command to the next display device and switch back to step 2;

Seventh, the display device searches for a nearby Bluetooth device containing certain keywords, if such Bluetooth device is found, the Bluetooth device would be connected and assigned to a device ID as the Bluetooth device becomes the new display device, the device ID would be transmitted to the new display device by SPP or BLE, and information indicating that a new display device has been found would be transmitted to the display device at the previous level and to the display device at the former previous level and so on, until the information is transmitted to the mobile app.

Eighth, if a Stop Search command is received, then exit to step 2, otherwise, send a Search command to the new display device and switch to step 7;

Ninth, transmits the Stop Search command to the display device at the next level and to the display device at the further next level and so on, until the searches are terminated, then switch to step 2.

Tenth, transmits the Termination command to the display device at the next level and to the display device at the further next level and so on, so that from the display device at the furthest next level, connections are disconnected at every level, and the display device is restored to its original state, then switch to step 2.

The connection relation between a connected mobile and display devices is shown as FIG. 5.

According to another embodiment of the present disclosure, a display method of wireless intelligent multi-screen display is provided, the method is basically the same as the above embodiments, the difference between these two is: the steps of configuring a display module and the steps of encoding the image data are performed on a display device rather than a mobile phone.

In particular, user uses a touch screen, a DIP switch or other input device to configure the display module. After the single-link serial connection shown as FIG. 5 is established between the mobile and all the displays, the mobile would transmit the original image data which has not been processed to the display which is connected to the mobile, and based on the configured display mode, the display would encode the image data which is to be transmitted into sub-image data which corresponds to each display, and such sub-image data would be transmitted to each corresponding display; each display caches the sub-image data that it receives and meanwhile play the sub-image data after receiving the play command.

In this way, design of the mobile app can be simplified, which means, when the mobile app plays the image through the display device, there is no need to consider the components of a display devices group, that is, a group of multiple display devices can be used as a complete display device.

According to another embodiment of the present disclosure, a display system of a wireless intelligent multi-screen display is provided, comprising the following modules: a first module, in which a control terminal scans nearby displays to establish connections with such displays; a second module, in which the control terminal or display is configured with a display mode based on the quantity and combination manner of the displays and a device ID is assigned to each corresponding display; a third module, in which the control terminal encodes the image data which is to be transmitted into sub-image data which corresponds to each display based on the configured display mode; a fourth module, in which the control terminal transmits the corresponding sub-image data to each display according to the corresponding device ID; and a fifth module, in which each of the displays which receives the corresponding sub-image data caches the sub-image data that the display receives, and meanwhile plays the sub-image data after receiving a play command.

According to another embodiment of the present disclosure, a computer-readable storage medium on which computer instructions are stored is provided, and the steps of the method according to the first aspect of the present disclosure can be implemented when the instructions are executed by a processor.

Those skilled in the art can realize that the units and algorithm steps of each embodiment described herein can be implemented by electronic hardware, or a combination of computer software and electronic hardware. Whether these functions are performed by means of hardware or software depends on the specific application and design constraints of the technical solution. A person skilled in the art can use different methods to implement the described functions for each specific application, but such implementation should not be considered as not within the protection scope of the present disclosure.

Those skilled in the art can clearly understand that, for the convenience and simplicity of description, the specific working processes of the systems, devices, and units described above can refer to the corresponding processes in the embodiments of the aforementioned method and therefore are not repeated here.

The above are merely the specific embodiments of the present disclosure, but the protection scope of the present disclosure is not limited thereto. Any modifications, equivalent substitutions and improvements made within the scope of the present disclosure should be included within the protection scope of the present disclosure. Therefore, the scope of protection of the present disclosure shall be subject to the protection scope of the claims.

What is claimed is:

1. A display method of wireless intelligent multi-screen display, based on a control terminal comprising a first wireless communication module, and on at least two displays comprising a second wireless communication module, and the control terminal is connected to each of the displays by means of wireless communication, wherein, the display method comprises:
scanning, by the control terminal, a display at a designated location and establishing a connection with the display,
configuring a display mode at the control terminal or the display based on a quantity and/or combination manner of the display, with a corresponding device ID assigned to each display;
encoding, by the control terminal, image data which is to be transmitted into sub-image data which corresponds to each display according to the configured display mode;
transmitting, by the control terminal, the corresponding sub-image data to each display according to the corresponding device ID;
caching, by each display which receives the corresponding sub-image data, the sub-image data, and meanwhile playing the sub-image data after receiving a play command from the control terminal;
scanning, by the control terminal, a display at a designated location and establishing a connection with the display comprises the following sub-steps,
scanning, by the control terminal, displays within a predetermined range and establishing a connection with one of the displays;
scanning, by the display connected with the control terminal, other displays within a predetermined range and establishing a connection with one of the displays which are to be connected;
scanning, by the connected display, other displays within a predetermined range and establishing a connection with one of the other displays which are not connected;
assigning and transmitting, by the connected display connected with a newly connected display, a device ID to the newly connected display;
transmitting, in a reverse order, by each of the connected display, the device ID of the newly connected display, until the device ID is transmitted back to the control terminal; and
repeating the above sub-steps until single-link serial connections are established between the control terminal and each of the displays.

2. A display method of wireless intelligent multi-screen display, based on a control terminal comprising a first wireless communication module, and on at least two displays comprising a second wireless communication module, and the control terminal is connected to each of the displays by means of wireless communication, wherein, the display method comprises:
scanning, by the control terminal, a display at a designated location and establishing a connection with the display,
configuring a display mode at the display based on a quantity and/or combination manner of each display, with a corresponding device ID assigned to the display;
transmitting, by the control terminal, image data to the display which encodes the image data to be transmitted into a sub-image data corresponding to each display according to the configured display mode;
transmitting, by the display, the corresponding sub-image data to other displays according to the corresponding device ID;
caching, by each display which receives the corresponding sub-image data, the sub-image data, and meanwhile playing the sub-image data after receiving a play command from the control terminal;
scanning, by the control terminal, a display at a designated location and establishing a connection with the display comprises the following sub-steps,
scanning, by the control terminal, displays within a predetermined range and establishing a connection with one of the displays;
scanning, by the display connected with the control terminal, other displays within a predetermined range and establishing a connection with one of the displays which are to be connected;
scanning, by the connected display, other displays within a predetermined range and establishing a connection with one of the other displays which are not connected;
assigning and transmitting, by the connected display connected with a newly connected display, a device ID to the newly connected display;

transmitting, in a reverse order, by each of the connected display, the device ID of the newly connected display, until the device ID is transmitted back to the control terminal; and repeating the above sub-steps until single-link serial connections are established between the control terminal and each of the displays.

3. The display method of claim 2, wherein the display is LED matrix.

4. The display method of claim 2, wherein different device ID is assigned to each display based on an MAC address of the second wireless communication module of the display.

5. The display method of claim 2, wherein the display mode comprises a layout table recording corresponding relations between the device IDs and the sub-image data; and the control terminal transmits the corresponding sub-image data to each display based on the layout table.

6. The display method of claim 5, wherein the control terminal or the display further comprises an input unit, and the display method further comprises steps of:
updating the layout table of the display mode based on a input of the input unit;
transmitting the corresponding sub-image data to each display based on the updated layout table.

7. A display system of wireless intelligent multi-screen display, wherein the system further comprises the following modules:
a first module, wherein a control terminal scans displays within a predetermined range to establish connections with such displays;
a second module, wherein the control terminal or a display is configured with a display mode based on a quantity and combination manner of the displays and a device ID is assigned to each corresponding display;
a third module, wherein the control terminal encodes an image data which is to be transmitted into sub-image data which corresponds to each display based on the configured display mode;
a fourth module, wherein the control terminal transmits the corresponding sub-image data to each display according to the corresponding device ID;
a fifth module, wherein each of the displays which receives the corresponding sub-image data caches the sub-image data, and meanwhile plays the sub-image data after receiving a play command; and
a control terminal scanning displays within a predetermined range to establish connections with such displays comprises the following sub-steps, scanning, by the control terminal, displays within a predetermined range and establishing a connection with one of the displays;
scanning, by the display connected with the control terminal, other displays within a predetermined range and establishing a connection with one of the displays which are to be connected;
scanning, by the connected display, other displays within a predetermined range and establishing a connection with one of the other displays which are not connected;
assigning and transmitting, by the connected display connected with a newly connected display, a device ID to the newly connected display;
transmitting, in a reverse order, by each of the connected display, the device ID of the newly connected display, until the device ID is transmitted back to the control terminal; and
repeating the above sub-steps until single-link serial connections are established between the control terminal and each of the displays.

8. A non-transitory computer-readable storage medium on which computer instructions are stored, wherein the steps of the method of claim 1 can be implemented when the instructions are executed by a processor.

9. A non-transitory computer-readable storage medium on which computer instructions are stored, wherein the steps of the method of claim 6 can be implemented when the instructions are executed by a processor.

10. The display method of claim 1, wherein the display is LED matrix.

11. The display method of claim 10, wherein different device ID is assigned to each display based on an MAC address of the second wireless communication module of the display.

12. The display method of claim 1, wherein the display mode comprises a layout table recording the corresponding relations between the device IDs and the sub-image data; and the control terminal transmits the corresponding sub-image data to each display based on the layout table.

13. The display method of claim 12, wherein the control terminal or the display further comprises an input unit, and the display method further comprises steps of:
updating the layout table of the display mode based on a input of the input unit;
transmitting the corresponding sub-image data to each display based on the updated layout table.

* * * * *